US009319632B2

United States Patent
Kim et al.

(10) Patent No.: US 9,319,632 B2
(45) Date of Patent: Apr. 19, 2016

(54) DISPLAY APPARATUS AND METHOD FOR VIDEO CALLING THEREOF

(71) Applicant: SAMSUNG ELECTRONICS CO., LTD., Suwon-si (KR)

(72) Inventors: Sang-yoon Kim, Yongin-si (KR); Bong-seok Lee, Suwon-si (KR); Hee-seob Ryu, Hwaseong-si (KR); Seung-kwon Park, Yongin-si (KR); Dong-ho Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 14/146,069

(22) Filed: Jan. 2, 2014

(65) Prior Publication Data

US 2014/0184726 A1  Jul. 3, 2014

(30) Foreign Application Priority Data

Jan. 2, 2013  (KR) .................. 10-2013-0000339

(51) Int. Cl.
| | | |
|---|---|---|
| *H04N 7/14* | (2006.01) | |
| *H04N 7/15* | (2006.01) | |
| *H04N 5/232* | (2006.01) | |

(52) U.S. Cl.
CPC ............. *H04N 7/15* (2013.01); *H04N 5/23219* (2013.01); *H04N 5/23229* (2013.01); *H04N 5/23293* (2013.01); *H04N 5/23296* (2013.01); *H04N 7/147* (2013.01)

(58) Field of Classification Search
CPC ....................................... H04N 7/14
USPC ...................... 348/14.01, 14.02, 14.07, 14.12
See application file for complete search history.

(56) References Cited

U.S. PATENT DOCUMENTS

| | | | |
|---|---|---|---|
| 8,416,277 B2 * | 4/2013 | Yeh ............................ | 348/14.02 |
| 2007/0013721 A1 | 1/2007 | Vau et al. | |
| 2009/0079813 A1 | 3/2009 | Hildreth | |
| 2009/0238419 A1 * | 9/2009 | Steinberg ........... | G06K 9/00221 382/118 |
| 2011/0216158 A1 * | 9/2011 | Bigioi et al. .................... | 348/36 |
| 2012/0105573 A1 * | 5/2012 | Apostolopoulos ..... | H04N 7/142 348/14.08 |
| 2012/0113862 A1 * | 5/2012 | Santhanam et al. .......... | 370/254 |

FOREIGN PATENT DOCUMENTS

| | | |
|---|---|---|
| EP | 2 104 336 A2 | 9/2009 |
| FR | 2 849 950 A1 | 7/2004 |

OTHER PUBLICATIONS

EP Communication dated Apr. 23, 2014, issued by the European Patent Office in counterpart European Application No. 13199563.1.

* cited by examiner

*Primary Examiner* — Olisa Anwah
(74) *Attorney, Agent, or Firm* — Sughrue Mion, PLLC

(57) ABSTRACT

A display apparatus and a method for video calling thereof are provided. The method includes: capturing an image; detecting a face of at least one user from the captured image; setting an interest area to include a preset body part of the at least one user whose face has been detected; editing the interest area set in the captured image to generate a video calling image; and transmitting the video calling image to an external apparatus.

19 Claims, 23 Drawing Sheets

440

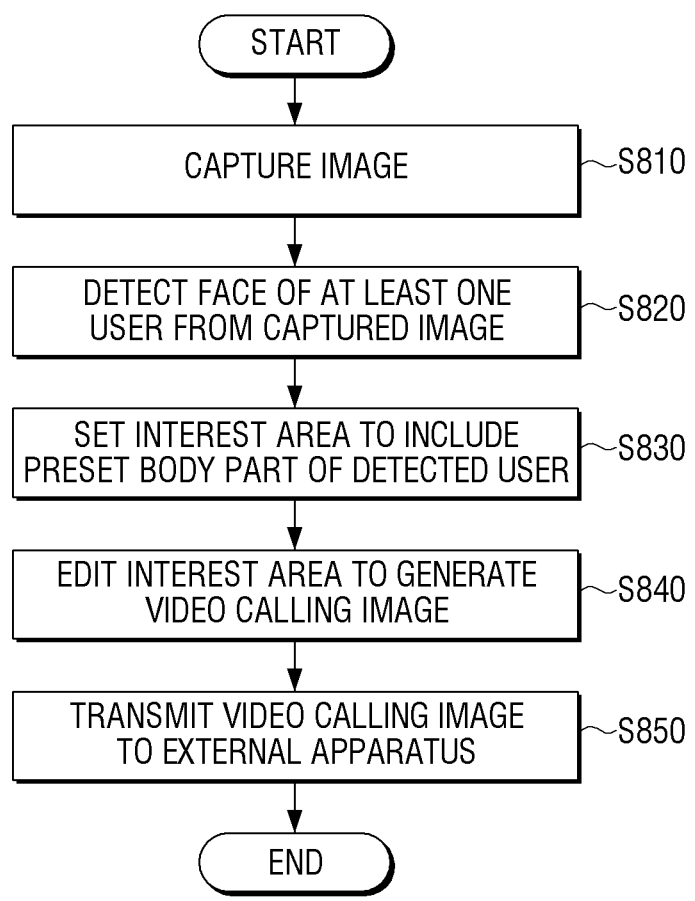

DISPLAY APPARATUS AND METHOD FOR VIDEO CALLING THEREOF

CROSS-REFERENCE TO RELATED APPLICATION(S)

This application claims priority from Korean Patent Application No. 10-2013-0000339, filed on Jan. 2, 2013, in the Korean Intellectual Property Office, the disclosure of which is incorporated herein by reference in its entirety.

BACKGROUND

1. Field

Methods and apparatuses consistent with the exemplary embodiments relate to providing a display apparatus and a method for video calling thereof, and more particularly, to providing a display apparatus which performs video calling with an external apparatus and a method for video calling thereof.

2. Description of the Related Art

As communication technology develops, and cameras are used in display apparatuses, a video calling function has been provided to recent display apparatuses. Therefore, a user may perform video calling with a family member or a friend through a large screen display apparatus.

However, although related art display apparatuses provide a video calling function, a camera of the related art display apparatus captures only a preset area. Therefore, the same position and the same size are provided to a user when performing video calling.

Therefore, if a display apparatus and a user are distant from each other, the user may appear to be small, and if the user is close to the display apparatus, a face of the user may appear to be too large.

Also, an image having the same position and the same size at all times is provided. Therefore, if one person is captured, the number of unnecessary areas increases in the image except for the area of the image that contains the captured person. If the image of a plurality of persons is to be captured, all of the plurality of persons may not appear in the image, or an uncomfortable pose may be required to capture all of the plurality of persons.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus which detects a user's face from an image and edits the image so that at least one interest area of a user, from which the user's face is detected, exists in a video calling image, and a method for video calling thereof.

According to an aspect of the exemplary embodiments, there is provided a video calling method of a display apparatus, including: capturing an image; detecting a face of at least one user from the captured image; setting an interest area to include a preset body part of the at least one user whose face has been detected; editing the interest area set in the captured image to generate a video calling image; and transmitting the video calling image to an external apparatus.

According to an aspect of the exemplary embodiments, if a face of at least one user is detected from the captured image, the interest area may be set so that a preset body part of the at least one user is positioned in a center of the interest area.

According to an aspect of the exemplary embodiments, if a face of at least one other user is additionally detected when the face of the at least one user is detected from the captured image, the interest area may be reset so that all of preset body parts of the at least one other user and the at least one user are positioned in the interest area.

According to an aspect of the exemplary embodiments, if faces of a plurality of users are detected from the captured image, the interest area may be set so that preset body parts of the plurality of users are positioned in the interest area.

According to an aspect of the exemplary embodiments, if a face of one of the plurality of users is moved outside the captured image and thus is not detected when the faces of the plurality of users are detected from the captured image, the interest area may be reset so that a preset body part of the other remaining users is positioned in the interest area.

According to an aspect of the exemplary embodiments, the generation of the video calling image may include: cropping the interest area from the captured image; and scaling the cropped interest area according to a display resolution to generate the video calling image.

According to an aspect of the exemplary embodiments, the video calling method may further include: if the preset body part of the at least one user whose face has been detected does not exist in the captured image, performing an electronic zoom operation so that the preset body part of the at least one user is positioned in the captured image.

According to an aspect of the exemplary embodiments, the preset body part of the at least one user may include the face and an upper body of the at least one user.

According to another aspect of the exemplary embodiments, there is provided a display apparatus including: a photographing device configured to capture an image; a controller configured to detect a face of at least one user from the captured image, set an interest area to include a preset body part of the at least one user whose face has been detected, and edit the interest area set in the captured image to generate a video calling image; and a communicator configured to transmit the video calling image to an external apparatus.

According to an aspect of the exemplary embodiments, if a face of one user is detected from the captured image, the controller may set the interest area so that a preset body part of the one user is positioned in a center of the interest area.

According to an aspect of the exemplary embodiments, if a face of at least one other user is additionally detected when the face of the at least one user is detected from the captured image, the controller may reset the interest area so that all of preset body parts of the at least one other user and the at least one user are positioned in the interest area.

According to an aspect of the exemplary embodiments, if faces of a plurality of users are detected from the captured image, the controller may set the interest area so that preset body parts of the plurality of users are positioned in the interest area.

According to an aspect of the exemplary embodiments, if a face of one of the plurality of users is moved outside the captured image and thus is not detected when the faces of the plurality of users are detected from the captured image, the controller may reset the interest area so that a preset body part of the remaining users is positioned in the interest area.

According to an aspect of the exemplary embodiments, the controller may crop the interest area from the captured image and scale the cropped interest area according to a display resolution to generate the video calling image.

According to an aspect of the exemplary embodiments, if the preset body part of the at least one user whose face has been detected does not exist in the captured image, the controller may perform an electronic zoom operation so that the preset body part of the at least one user is positioned in the interest area.

According to an aspect of the exemplary embodiments, thee preset body part of the user may include the face and an upper body.

BRIEF DESCRIPTION OF THE DRAWINGS

The above and/or other aspects will be more apparent by describing certain exemplary embodiments with reference to the accompanying drawings, in which:

FIG. 8 is a flowchart illustrating a method for video calling of a display apparatus according to an exemplary embodiment.

DETAILED DESCRIPTION OF EXEMPLARY EMBODIMENTS

Figure 1:
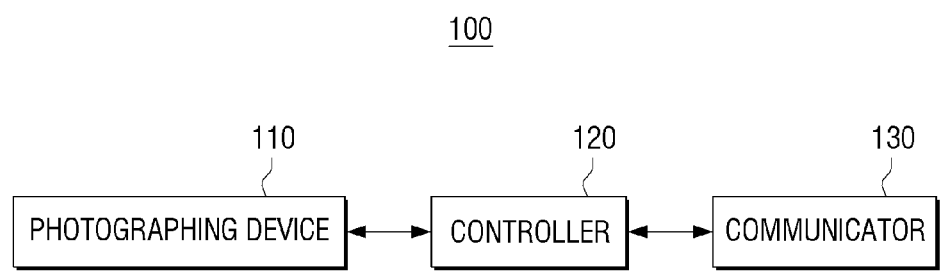
FIG. 1 is a schematic block diagram illustrating a structure of a display apparatus according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a schematic block diagram illustrating a structure of a display apparatus 100 according to an exemplary embodiment. Referring to FIG. 1, the display apparatus 100 includes a photographing device 110, a controller 120, and a communicator 130. The display apparatus 100 may be a television (TV) which performs video calling, but this is only exemplary. Therefore, the display apparatus 100 may be realized as another type of display apparatus which performs video calling such as a portable phone, a tablet personal computer (PC), a notebook PC, a desktop PC, or the like.

The photographing device 110 captures a preset area in which a user may be positioned to generate an image. The photographing device 110 may be installed in a bezel of the display apparatus 100 or may be positioned at an upper end of the display apparatus 100 to capture the preset area.

The controller 120 detects a face of at least one user from a captured image, sets an interest area to include a preset body part of the at least one user whose face is detected, and edits the set interest area in the captured image to generate a video calling image.

In particular, the controller 120 detects at least one user's face from a captured image. In detail, the controller 120 detects elements (e.g., eyes, a nose, a mouth, a head, etc.) constituting a face of a user from a captured image to detect at least one user's face. In particular, the controller 120 may detect the face of the user from the captured image by using knowledge-based methods, feature-based methods, template-matching methods, appearance-based methods, or the like.

The controller 120 sets the interest area to include the preset body part of the at least one user whose face is detected. Here, the interest area may be a rectangular area including the preset body part (e.g., a face or an upper body) of the user except an unnecessary area in the captured image. An aspect ratio of the interest area may be equal to an aspect ratio of a display resolution.

In particular, if a face of one user is detected from a captured image, the controller 120 may set an interest area so that a preset body part of the user is positioned in a center of the interest area. If faces of a plurality of users are detected from the captured image, the controller 120 may set the interest area so that all of preset body parts of the plurality of users are positioned within the interest area.

Also, if a face of a user is continuously traced in the captured image to determine that a face of a new user has been added into the captured image or the face of the existing user has been removed from the captured image, the controller 120 may reset the interest area. In detail, if a face of at least one other user is additionally detected when a face of one user is detected from the captured image, the controller 120 may reset the interest area so that a preset body part of the one user and a preset body part of the additionally detected at least one other user are all positioned in the interest area. If a face of one of a plurality of users is moved outside the captured image and thus is not detected when faces of the plurality of users are detected from the captured image, the controller 120 may reset the interest area so that preset body parts of the other one of the plurality of remaining users is positioned in the interest area.

If all portions of the preset body part of the at least one user whose face has been detected does not exist in the captured image, the controller 120 may perform an electronic zoom operation so that the preset body part of the at least one user exists in the captured image. For example, if only a face of a user is captured in the captured image, the controller 120 may perform an electric zoom-out operation so that an upper body of the user is included in the captured image.

The controller 120 edits the interest of the captured image to generate the video calling image. In detail, the controller 120 crops a set interest area from the captured image and scales the cropped image according to a display resolution to generate a video calling image.

The communicator 130 communicates with an external display apparatus. In particular, the communicator 130 transmits the video calling image, which is generated by the controller 120 to perform video calling, and receives a video calling image from the external display apparatus. Here, the video calling image received from the external display apparatus is scaled by the controller 120 according to a resolution of a display screen and outputs through a display device (not shown).

As described above, a face of a user is traced in a captured image to set an interest area in order to provide a high-quality video calling image to a user when performing video calling.

Figure 2:
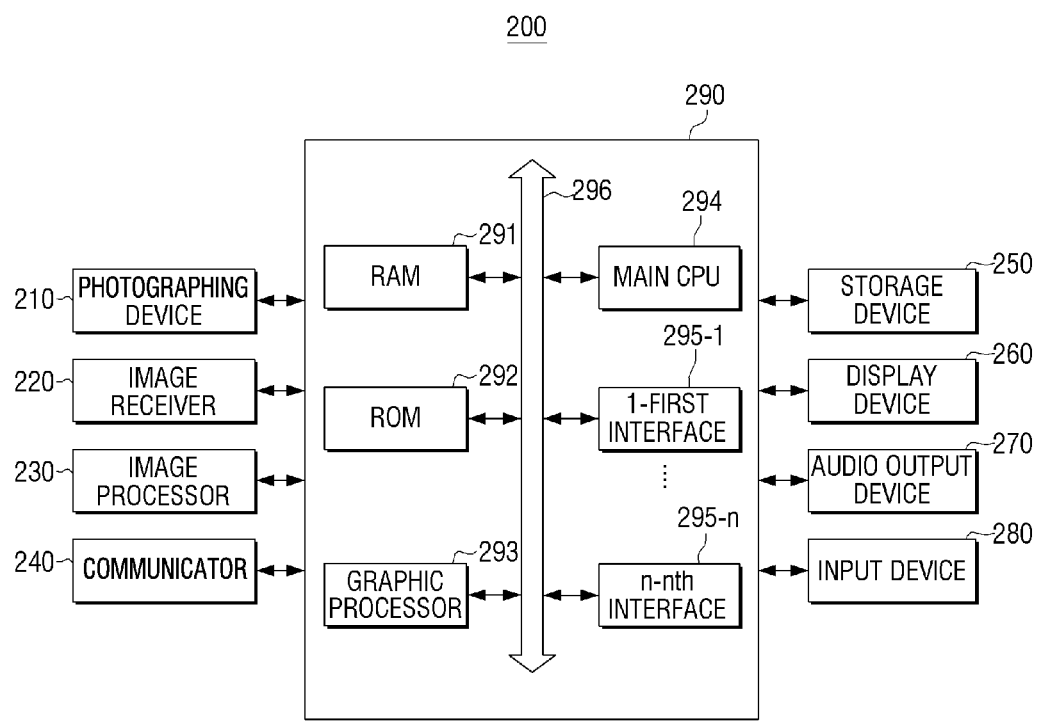
FIG. 2 is a detailed block diagram illustrating a structure of a display apparatus according to an exemplary embodiment.

A display apparatus according to an exemplary embodiment will now be described in more detail with reference to FIGS. 2 through 7D. FIG. 2 is a detailed block diagram illustrating a structure of a display apparatus 200 according to an exemplary embodiment. Referring to FIG. 2, the display apparatus 200 includes a photographing device 210, an image receiver 220, an image processor 230, a communicator 240, a storage device 250, a display device 260, an audio output device 270, an input device 280, and a controller 290.

FIG. 2 synthetically illustrates various elements of the display apparatus 200 as an example of an apparatus having various functions such as a video calling function, a communicating function, a broadcast receiving function, a moving picture playing function, a displaying function, etc. Therefore, according to an exemplary embodiment, some of the elements of FIG. 2 may be omitted or changed or other elements may be further added.

The photographing device 210 captures a preset area in which a user may be positioned, to generate an image. In particular, the photographing device 210 may include a shutter (not shown), a lens device (not shown), an iris (not shown), a charge-coupled device (CCD) image sensor, and an analog-to-digital converter (ADC) (not shown). The shutter adjusts an amount of exposed light together with the iris. The lens device receives light from an external light source to process an image. Here, the iris adjusts an amount of incident light according to opened and closed degrees. The CCD image sensor accumulates amounts of light incident through the lens device and outputs an image captured by the lens device according to a vertical sync signal. Image acquiring of the display apparatus 200 is achieved by the CCD image sensor which converts light reflected from a subject into an electrical signal. A color filter is required to acquire a color image by using the CCD image sensor, and a color filter array (CFA) is mainly used. The CFA transmits only light indicating one color per one pixel, has a regular array structure, and is classified into several types according to array structures. The ADC converts an analog image signal output from the CCD image sensor into a digital image signal. The photographing device 210 captures an image according to a method as described above, but this is only exemplary. Therefore, the photographing device 210 may capture an image according to other methods. For example, the photographing device 210 may capture an image by using a complementary metal oxide semiconductor (CMOS) image sensor not the CCD image sensor.

The image receiver 220 receives image data from various types of sources. In detail, the image receiver 220 may receive broadcast data from an external broadcasting station and receive image data from an external apparatus (e.g., a set-top box, a digital versatile disc (DVD) device, a universal serial bus (USB) device, or the like).

The image processor 230 processes the image data received from the image sensor 220. The image processor 230 performs various types of image-processing, such as decoding, scaling, noise-filtering, frame rate converting, resolution transforming, etc., with respect to the image data.

The communicator 240 communicates with various types of external apparatuses according to various types of communication methods. In particular, the communicator 240 transmits and receives image data and voice data to perform video calling with an external display apparatus.

The communicator 240 may include various types of communication chips such as a WiFi chip, a Bluetooth chip, a near field communication (NFC) chip, a wireless communication chip, etc. Here, the WiFi chip, the Bluetooth chip, and the NFC chip respectively perform communications according to a WiFi method, a Bluetooth method, and an NFC method. Among theses, the NFC chip refers to a chip which operates according to an NFC method using a frequency band of 13.56 MHz among various radio frequency identification (RFID) frequency bands of 135 KHz, 13.56 MHz, 433 MHz, 860 MHz to 960 MHz, 2.45 GHz, etc. If the WiFi chip or the Bluetooth chip is used, the communicator 240 may transmit and receive various types of connection information such as a subsystem identification (SSID), a session key, etc. and perform a communication connection by using the various types of connection information to transmit and receive various types of information. The wireless communication chip refers to a chip which performs a communication according to various types of communication standards such as Institute of Electrical and Electronics Engineers (IEEE), Zigbee, 3rd Generation (3G), 3rd Generation Partnership Project (3GPP), Long Term Evolution (LTE), etc.

The storage device 250 stores various types of modules for driving the display apparatus 200. For example, the storage device 250 may store software including a base module, a sensing module, a communication module, a presentation module, a web browser module, and a service module. Here, the base module processes signals transmitted from various types of hardware of the display apparatus 200 and transmits the processed signals to an upper layer module. The sensing module collates information from various types of sensors, and parses and manages the collated information and may include a face recognition module, a voice recognition module, a motion recognition module, an NFC recognition module, etc. The presentation module forms a display screen and may include a multimedia module which plays and outputs a multimedia content and a user interface (UI) rendering module which processes a UI and a graphic. The communication module performs communication with an external apparatus. The web browser module performs web browsing to access a web server. The service module includes various types of applications for providing various types of services.

The storage device 250 may include a face detecting module, an interest area setting module, and a video calling image generating module. Here, the face detecting module detects a user's face from a captured image, and the interest area setting module sets an interest area including a preset body part of a user. The video calling image generating module edits the interest area to generate a video calling image.

As described above, the storage device 250 may include various types of program modules, but some of the various types of program modules may be omitted or modified, or other types of program modules may be added according to a type and a characteristic of the display apparatus 200. For example, if the display apparatus 200 is realized as a tablet PC, the base module may further include a position determining module for determining a global positioning system (GPS)-based position, and the sensing module may further include a sensing module for sensing an operation of the user.

The display device 260 displays at least one of the image data received from the image receiver 220, a video fame processed by the image processor 230, and various types of screens generated by a graphic processor 293.

In particular, when performing video calling, the display device 260 may display a video calling image transmitted from the external apparatus as a main screen and display a video calling image, which is generated by extracting an interest area from a captured image, as a picture-in-picture (PIP) screen. Here, the display device 260 may display the video calling image transmitted from the external apparatus as the PIP screen and display the video calling image, which is generated by extracting the interest area from the captured image, as the main screen through a user input.

The audio output device 270 outputs various types of audio data processed by an audio processor (not shown) and various types of notification sounds or voice messages. In particular, when performing video calling, the audio output device 270 outputs video calling voice data transmitted from an external display apparatus.

The input device 280 receives a user command which is to control an overall operation of the display apparatus 200. Here, the input device 280 may be realized as a remote controller including a plurality of buttons, but this is only exemplary. Therefore, the input device 280 may be realized as another type of input device which controls the display apparatus 200 like a touch panel, a pointing device, or the like.

The controller 290 controls the overall operation of the display apparatus 200 by using various types of programs stored in the storage device 250.

As shown in FIG. 2, the controller 290 includes a random access memory (RAM) 291, a read only memory 292, the graphic processor 293, a main central processing unit (CPU) 294, first through nth interfaces 295-1 through 295-n, and a bus 296. Here, the RAM 291, the ROM 292, the graphic processor 293, the main CPU 294, and the first through nth interfaces 295-1 through 295-n are connected to one another through the bus 296

The ROM 292 stores a command set for booting a system, etc. If power is supplied through an input of a turn-on command, the main CPU 294 copies an operating system (O/S) stored in the storage device 250 into the RAM 291 and executes the O/S to boot the system. If the system is completely booted, the main CPU 294 copies various types of application programs stored in the storage device 250 into the RAM 291 and executes the application programs copied into the RAM 291 to perform various operations.

The graphic processor 293 generates a screen including various types of objects, such as an icon, an image, a text, etc., by using an operation device (not shown) and a renderer (not shown). The operation device calculates attribute values of the objects, such as coordinate values at which the objects are to be represented, shapes, sizes, colors, etc. of objects, according to a layout of the screen, by using a control command received from the input device 280. The renderer generates a screen which includes objects and have various layouts, based on the attribute values calculated by the operation device. The screen generated by the renderer is displayed in a display area of the display device 260.

The main CPU 294 accesses the storage device 240 to perform booting by using the O/S stored in the storage device 250. The main CPU 294 performs various operations by using various types of programs, contents, data, etc. stored in the storage device 250.

The first through nth interfaces 295-1 through 295-n are connected to the above-described various types of elements. One of the first through nth interfaces 295-1 through 295-n may be a network interface which is connected to the external apparatus through a network.

In particular, when an image is captured by the photographing device 210, the controller 290 detects at least one user's face from the captured image. Here, the controller 290 detects the at least one user's face from the captured image by using various types of face detecting methods such as a knowledge-based method, a feature-based method, a template-matching method, an appearance-based method, etc.

The knowledge-based method refers to a method of detecting a face by using a predetermined distance and a position relation between face components such as eyebrows, eyes, a nose, a mouth, etc. of a face of a user. The feature-based method refers to a method of detecting a face by using information about sizes and shapes of facial features (eyes, a nose, a mouth, a contour, a brightness, etc.), correlations of the facial features, and a color and a texture of a face and information about mixtures of the facial features. The template-matching method refers to a method of forming a standard template of all faces that are objects and comparing a similarity relation between the standard template and an input image to detect a face. Examples of the template-matching method include a predefined template algorithm and a modified template algorithm. The appearance-based method refers to a method of detecting a face by using a model which is learned through a learning image set by using a pattern recognition. The controller 290 may detect a face of a user by using other methods besides the above-described methods.

The controller 290 sets an interest area to include a preset body part (e.g., a face or an upper body) of at least one user whose face has been detected, and edits the interest area set in the captured image to generate a video calling image. Here, the interest area refers to an area which includes the preset body part of the at least one user whose face has been detected in the captured image and from which an unnecessary area is maximally removed. In particular, the interest area may be a rectangular area which includes the preset body part of the at least one user whose face has been detected in the captured image, in a maximum size.

Methods of extracting an interest area to generate a video calling image through the controller 290 will now be described with reference to FIGS. 3A through 7D.

FIGS. 3A through 3D are views illustrating a method of generating a video calling image if a face of one user is detected, according to an exemplary embodiment.

Figure 3A:
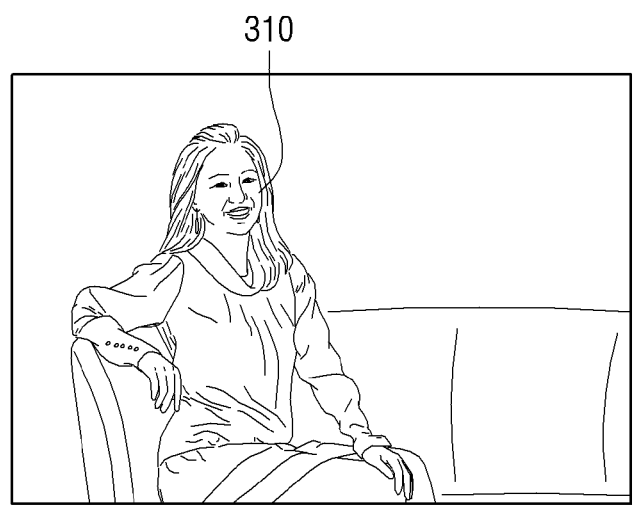
FIGS. 3A through 3D are views illustrating a method of generating a video calling image if a face of one user is detected, according to an exemplary embodiment.
Figure 3B:
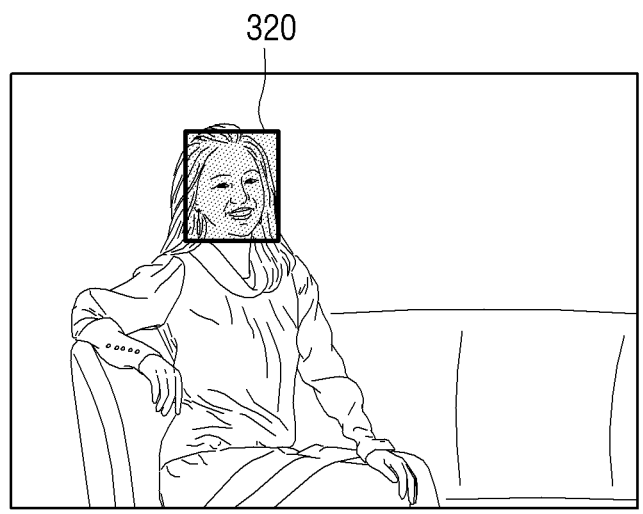

As shown in FIG. 3A, the photographing device 210 captures an image including one user 310. As shown in FIG. 3B, the controller 290 detects a face 320 of a user included in the captured image by using a face detecting module.

Figure 3C:
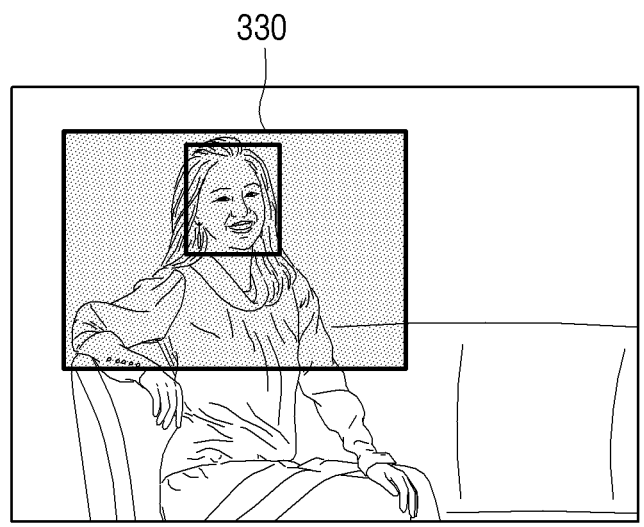

As shown in FIG. 3C, the controller 290 sets an interest area 330 including a face and an upper body of a user whose face has been detected. Here, the controller 290 sets the interest area 330 having a rectangular shape so that an aspect ratio is equal to a display resolution, to position the face and the upper body of the user in a center of the interest area 330.

Figure 3D:
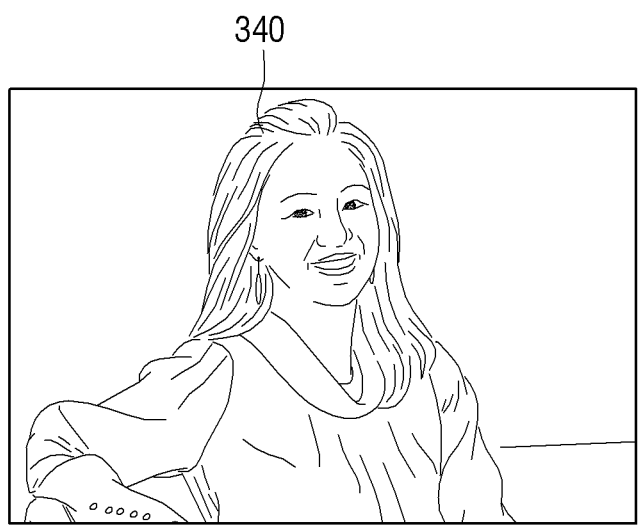

As shown in FIG. 3D, the controller 290 crops the interest area 330 from the captured image and scales the cropped interest area 330 according to the display resolution to generate a video calling image 340. For example, if a resolution of the cropped interest area 330 is 640×360, and the display resolution is 1,280×720, the controller 290 may upscale the resolution of the cropped interest area 330 to the display resolution of 1,280×720.

FIGS. 4A through 4D are views illustrating a method of generating a video calling image if faces of a plurality of users are detected, according to an exemplary embodiment.

Figure 4A:
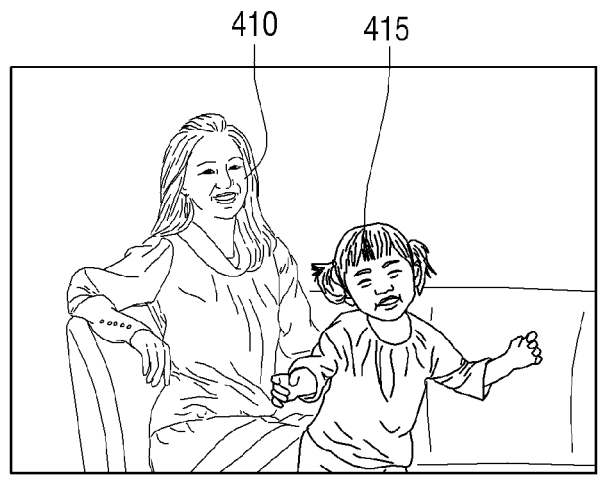
FIGS. 4A through 4D are views illustrating a method of generating a video calling image if faces of a plurality of users are detected, according to an exemplary embodiment.
Figure 4B:
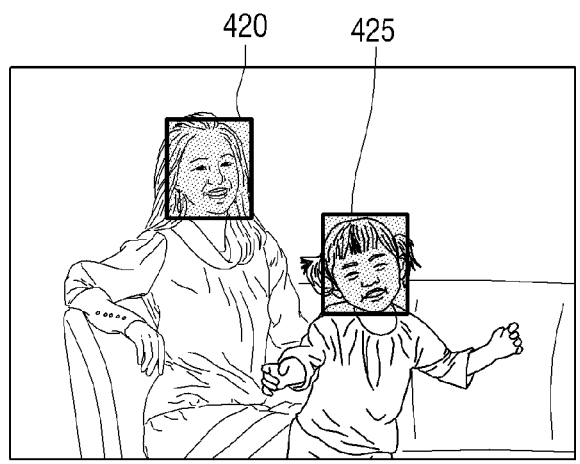

As shown in FIG. 4A, the photographing device 210 captures an image including two users 410 and 415. As shown in FIG. 4B, the controller 290 detects faces 420 and 425 of the two users 410 and 415 included in the captured image by using a face detecting module.

Figure 4C:
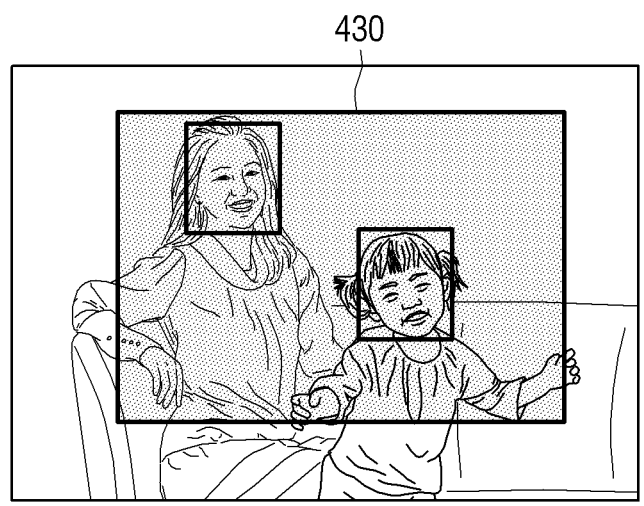

As shown in FIG. 4C, the controller 290 sets an interest area 430 including faces and upper bodies of the two users 410 and 415. Here, the controller 290 sets the interest area 430 having a rectangular shape to include the faces and the upper bodies of the two users 410 and 415 and to allow an aspect ratio of the interest area 430 to be equal to a display resolution.

Figure 4D:
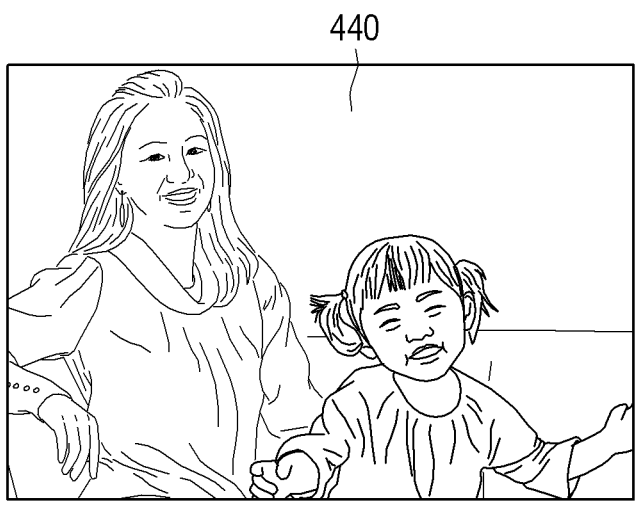

As shown in FIG. 4D, the controller 290 crops the interest area 430 from the captured image and scales the cropped interest area 430 according to the display resolution to generate a video calling image 440. For example, if a resolution of the cropped interest area 430 is 960×540, and the display resolution is 1280×720, the controller 290 may upscale the resolution of the cropped interest area 430 to the display resolution of 1280×720.

FIGS. 5A through 5D are views illustrating a method of generating a video calling image if a face of a user is additionally detected, according to an exemplary embodiment.

Figure 5A:
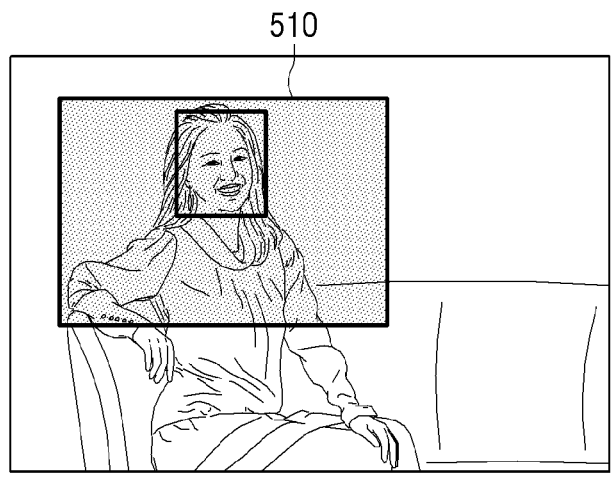
FIGS. 5A through 5D are views illustrating a method of generating a video calling image if a face of a user is additionally detected, according to an exemplary embodiment.

The controller 290 detects a first user to set a first interest area 510 as shown in FIG. 5A.

Figure 5B:
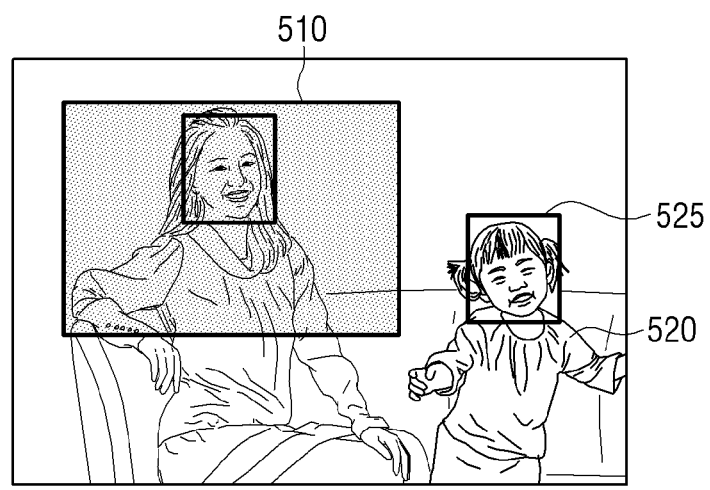
Figure 5C:
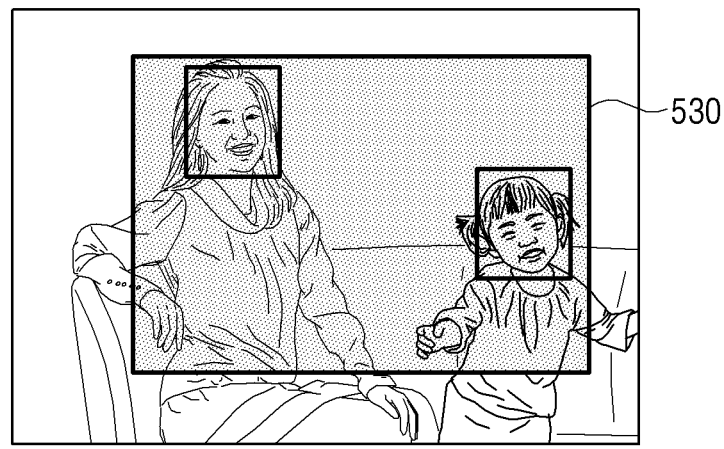
Figure 5D:
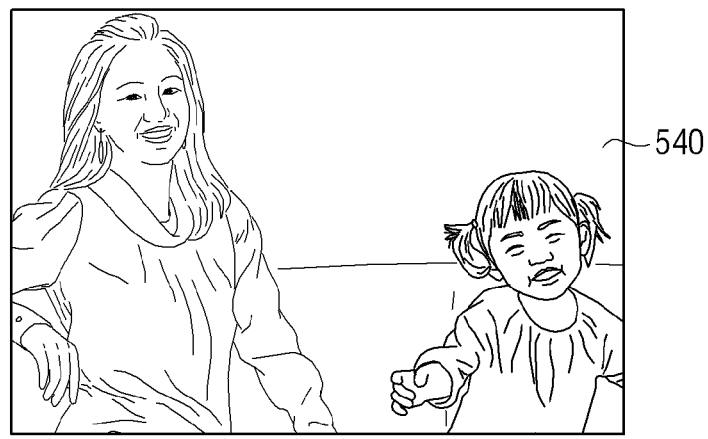

If a face 525 of a second user 520 is additionally detected as shown in FIG. 5B when the first user is detected in a captured image, the controller 290 sets a second interest area 530 to include faces and upper bodies of two users as shown in FIG. 5C. Here, the controller 290 sets the second interest area 530 having a rectangular shape so that an aspect ratio of the second interest area 530 is equal to a display resolution The controller 290 crops the second interest area 530 from the captured image and scales the cropped second interest area 530 according to the display resolution to generate a video calling image 540 as shown in FIG. 5D. For example, if a resolution of the cropped second interest area 530 is 960×540, and the display resolution is 1280×720, the controller 290 may upscale the resolution of the cropped second interest area 530 to the display resolution of 1280×720.

FIGS. 6A through 6D are views illustrating a method of generating a video calling image if a face of one of a plurality of users is moved, according to an exemplary embodiment.

Figure 6A:
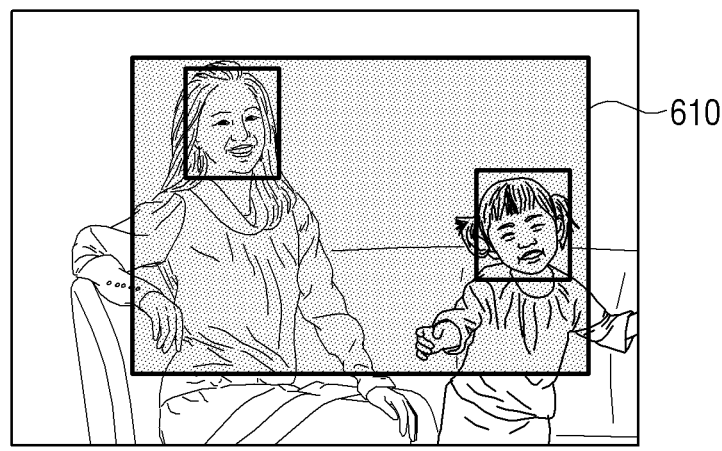
FIGS. 6A through 6D are views illustrating a method of generating a video calling image if a face of one of a plurality of users is moved outside an image, according to an exemplary embodiment.

As shown in FIG. 6A, the controller 290 detects two users to set a first interest area 610.

Figure 6B:
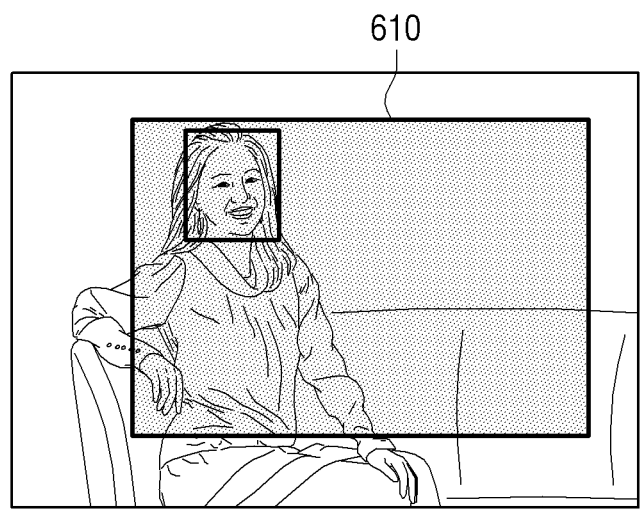
Figure 6C:
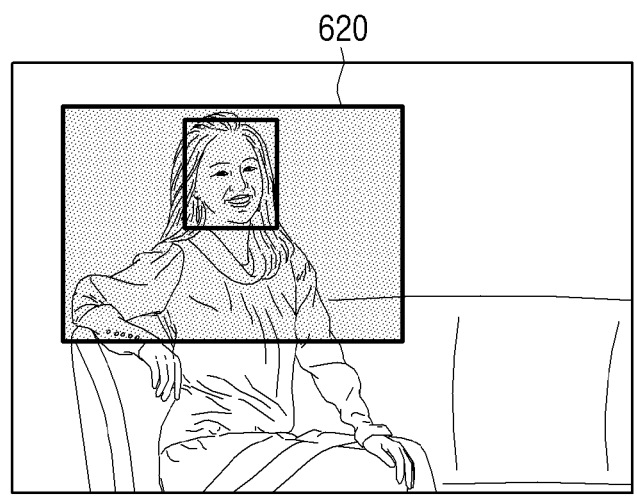

If one user is moved outside an image capturing area, and thus only a face of one user is detected as shown in FIG. 6B when the two users were originally detected in a captured image, the controller 290 sets a second interest area 620 to include only a face and an upper body of the currently remaining user as shown in FIG. 6C. Here, the controller 290 sets the second interest area 620 having a rectangular shape so that an aspect ratio of the second interest area 620 is equal to a display resolution.

Figure 6D:
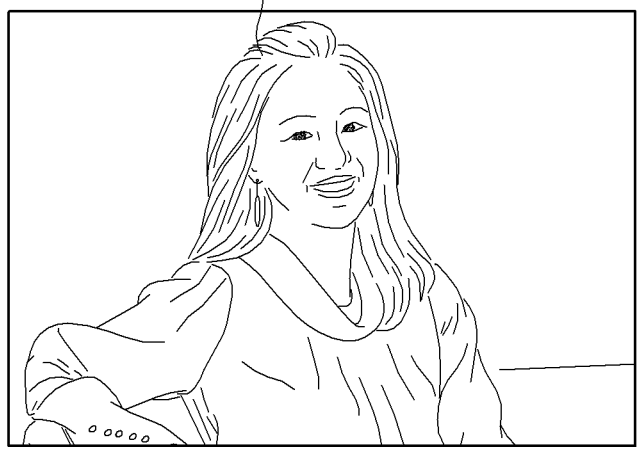

The controller 290 crops the second interest area 620 from the captured image and scales the cropped second interest area 620 according to the display resolution to generate a video calling image 630 as shown in FIG. 6D. For example, if a resolution of the cropped second interest area 620 is 620×360, and the display resolution is 1280×720, the controller 290 may upscale the resolution of the cropped second interest area 620 to the display resolution of 1280×720.

FIGS. 7A through 7D are views illustrating a method of generating a video calling image if a whole part of an interest area is not captured, according to an exemplary embodiment.

Figure 7A:
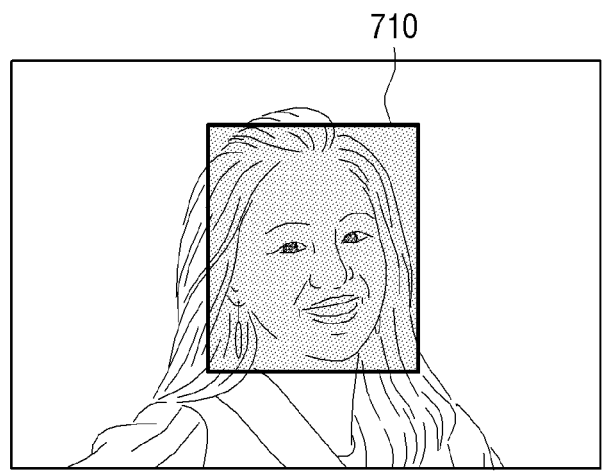
FIGS. 7A through 7D are views illustrating a method of generating a video calling image if a whole part of an interest area is not captured, according to an exemplary embodiment.

As shown in FIG. 7A, the controller 290 detects a face 710 of a user from a captured image. The controller 290 may detect a face and an upper body of a user to set an interest area.

Figure 7B:
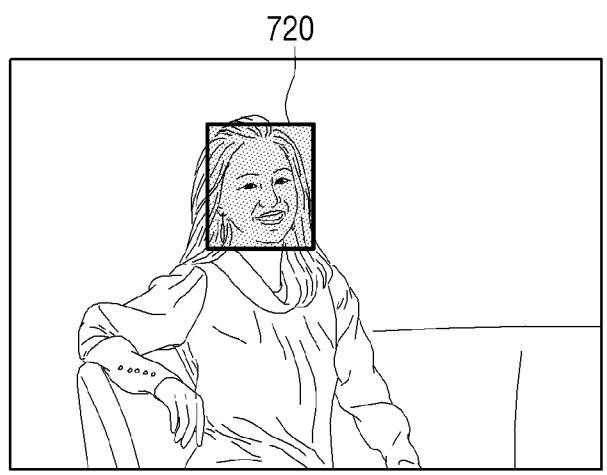

However, if the upper body of the user is not captured and thus is not detected as shown in FIG. 7A, the controller 290 performs an electronic zoom operation to capture the upper body of the user in order to acquire an image 720 in which a size of the user is enlarged as shown in FIG. 7B.

Figure 7C:
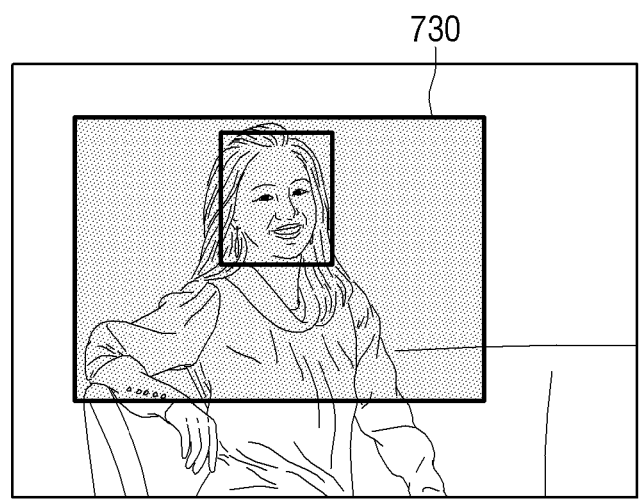
Figure 7D:
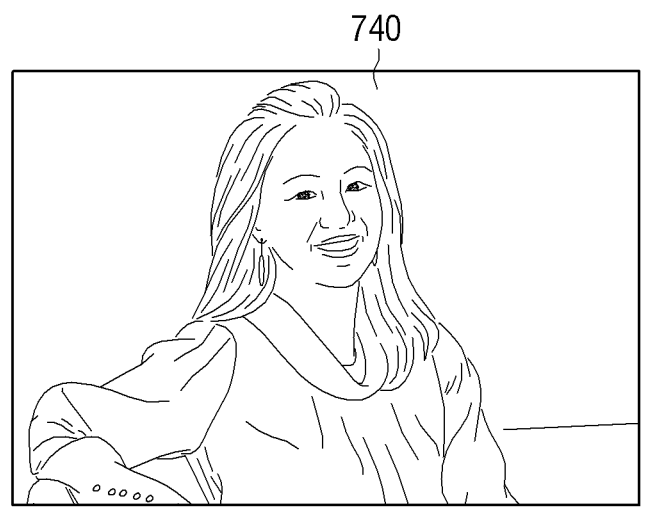

As shown in FIG. 7C, the controller 290 sets an interest area 730 to include the face and the upper body of the detected user. Here, the controller 290 sets the interest area 730 having a rectangular shape so that the face and the upper body of the user whose face has been detected are positioned in a center of the interest area 730 and an aspect ratio of the interest area 730 is equal to a display resolution The controller 290 crops the interest area 730 from the captured image and scales the cropped interest area 730 according to the display resolution to generate a video calling image 740 as shown in FIG. 7D. For example, if a resolution of the cropped interest area 730 is 640×360, and the display resolution is 1280×720, the controller 290 may upscale the resolution of the cropped interest area 730 to the display resolution of 1280×720.

The controller 290 may control the communicator 240 to transmit a video calling image generated according to the above-described exemplary embodiments to an external display apparatus.

If video calling image data and video calling voice data are received from the external display apparatus through the communicator 240, the controller 290 performs image signal-processing with respect to the video calling image data to display a signal-processed video calling image on the display device 260 and performs voice signal-processing with respect to the video calling voice data to output a signal-processed video calling voice to the audio output device 270.

In particular, the controller 290 controls the display device 260 to display a video calling image received from an external apparatus on a main screen and display a video calling image, which is generated by extracting an interest area from a captured image, as a PIP image.

As described above, the display apparatus 200 traces at least one user in a captured image to extract an interest area and provides a high-quality screen through the interest area. Therefore, a user is provided with natural and convenient video calling by using a display apparatus.

In the exemplary embodiments described with reference to FIGS. 3A through 7D, the controller 290 sets an interest area so that the interest area includes all parts of a preset body part of a user and an aspect ratio of the interest area is equal to an aspect ratio of a display resolution. However, this is only exemplary, and thus the controller 290 may set an interest area according to other methods. For example, the controller 290 may set an interest area so that a ratio of a face and an upper body of a user in the interest area is maximized. The controller 290 sets the interest area so that a blank space having a preset size exists around the face and the body part of the user. Here, the preset size of the blank space may be set by a user.

In the above-described exemplary embodiments, a face and an upper body are described as a preset body part of a user, but this is only exemplary. Therefore, other body parts (e.g., a face and shoulders) may be applied as the preset body part.

A video calling method of the display apparatus 100 will now be described in more detail with reference to FIG. 8.

In operation S810, the display apparatus 100 captures an image of a preset area. Here, the display apparatus 100 captures the image including at least one user.

In operation S820, the display apparatus 100 detects a face of at least one user in the captured image. In detail, the display apparatus 100 detects the face of the at least one user in the captured image by using various types of face detecting methods (e.g., a knowledge-based method, a feature-based method, a template-matching method, an appearance-based method, etc.)

In operation S830, the display apparatus 100 sets an interest area to include a preset body part of the detected user. In detail, the display apparatus 100 sets the interest area according to the methods described with reference to FIGS. 2 through 7D.

In operation S840, the display apparatus 100 edits the interest area to generate a video calling image. In detail, the display apparatus 100 crops the set interest area and scales the cropped interest area according to a display resolution to generate the video calling image.

In operation S850, the display apparatus 100 transmits the video calling image to an external apparatus.

Therefore, a user performs video calling by using an image in which a captured user exists in an optimum size.

A video calling method of a display apparatus according to the above-described various exemplary embodiments may be realized as a computer program and provided to the display apparatus.

There may be provided a non-transitory computer readable medium which stores a program including: capturing an image; detecting a face of at least one user from the captured image; setting an interest area to include a preset body part of the at least one user whose face has been detected; editing the interest area in the captured image to generate a video calling image; and transmitting the video calling image to an external apparatus.

The non-transitory computer readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A video calling method of a display apparatus, the method comprising:
   capturing an image;
   detecting a face of at least one user from the captured image;
   setting an interest area to include the detected face of the at least one user and an upper body of the at least one user;
   editing the set interest area in the captured image to generate a video calling image based on a display resolution of the display apparatus; and
   transmitting the video calling image to an external apparatus.

2. The video calling method of claim 1, wherein if the face of the at least one user is detected from the captured image, the interest area is set so that the preset body part of the at least one user is positioned in a center of the interest area.

3. The video calling method of claim 2, wherein if a face of another user is additionally detected when the face of the at least one user is detected from the captured image, the interest area is reset so that all of preset body parts of the another user and the at least one user are positioned in the interest area.

4. The video calling method of claim 1, wherein if faces of a plurality of users are detected from the captured image, the interest area is set so that preset body parts of the plurality of users are positioned in the interest area.

5. The video calling method of claim 4, wherein if a face of one of the plurality of users is moved outside the captured image and thus is not detected when the faces of the plurality of users are detected from the captured image, the interest area is reset so that a preset body part of at least a remaining one of the plurality of users is positioned in the interest area.

6. The video calling method of claim 1, wherein the generation of the video calling image comprises:
   cropping the interest area from the captured image; and
   scaling the cropped interest area according to a display resolution to generate the video calling image.

7. The video calling method of claim 1, further comprising:
   if the preset body part of the at least one user whose face has been detected does not exist in the captured image, performing an electronic zoom operation so that the preset body part of the at least one user is positioned in the captured image.

8. The video calling method of claim 1, wherein the face and the upper body of the at least one user are included in a preset body part of the at least one user.

9. A display apparatus comprising:
   a photographing device configured to capture an image;
   a controller configured to detect a face of at least one user from the captured image, set an interest area to include the detected face of the at least one user and an upper body of the at least one user, and edit the interest area set in the captured image to generate a video calling image based on a display resolution of the display apparatus; and
   a communicator configured to transmit the video calling image to an external apparatus.

10. The display apparatus of claim 9, wherein if the face of the at least one user is detected from the captured image, the controller sets the interest area so that the preset body part of the at least one user is positioned in a center of the interest area.

11. The display apparatus of claim 10, wherein if a face of another user is additionally detected when the face of the at least one user is detected from the captured image, the controller resets the interest area so that all of preset body parts of the another user and the at least one user are positioned in the interest area.

12. The display apparatus of claim 9, wherein if faces of a plurality of users are detected from the captured image, the controller sets the interest area so that preset body parts of the plurality of users are positioned in the interest area.

13. The display apparatus of claim 12, wherein if a face of one of the plurality of users is moved outside the captured image and thus is not detected when the faces of the plurality of users are detected from the captured image, the controller resets the interest area so that a preset body part of at least a remaining one of the plurality of users is positioned in the interest area.

14. The display apparatus of claim 9, wherein the controller crops the interest area from the captured image and scales the cropped interest area according to a display resolution to generate the video calling image.

15. The display apparatus of claim 9, wherein if the preset body part of the at least one user whose face has been detected does not exist in the captured image, the controller performs an electronic zoom operation so that the preset body part of the at least one user is positioned in the interest area.

16. The display apparatus of claim 9, wherein the face and the upper body are included in a preset body part of the at least one user.

17. A video calling method of a display apparatus, the video calling method comprising:
   capturing an image of at least one user;
   detecting a face of the user from the captured image;

setting an interest area including the detected face of the user and an upper body of the user;

editing the interest area based on a display resolution of the display apparatus, and generating a video call image based on the face and the upper body in the edited interest area.

18. The method of claim 17, wherein if an image of an additional user is detected in the captured image, the interest area is reset to include the face and the upper body of the at least one user and a face and an upper body of the additional user.

19. The method of claim 17, wherein the editing of the interest area comprises cropping the interest area from the captured image, and scaling the cropped interest area based on the display resolution of the display apparatus.

* * * * *